United States Patent
Renner (10) Patent No.: US 12,072,052 B2
(45) Date of Patent: Aug. 27, 2024

(54) HOSE CONNECTOR

(71) Applicant: HUSQVARNA AB, Huskvarna (SE)

(72) Inventor: Thomas Renner, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/283,300

(22) PCT Filed: Dec. 16, 2021

(86) PCT No.: PCT/EP2021/086095
§ 371 (c)(1),
(2) Date: Sep. 21, 2023

(87) PCT Pub. No.: WO2022/199875
PCT Pub. Date: Sep. 29, 2022

(65) Prior Publication Data
US 2024/0084942 A1    Mar. 14, 2024

(30) Foreign Application Priority Data

Mar. 23, 2021 (EP) ..................................... 21164335

(51) Int. Cl.
*F16L 37/40* (2006.01)
(52) U.S. Cl.
CPC ................... *F16L 37/40* (2013.01)
(58) Field of Classification Search
CPC .................................. F16L 37/40; F16L 29/02
(Continued)

(56) References Cited

U.S. PATENT DOCUMENTS 3,168,125 A * 2/1965 Rosell ................. B67D 7/3209
141/346
3,583,667 A * 6/1971 Amneus, Jr. .......... F16L 37/252
285/376
(Continued)

FOREIGN PATENT DOCUMENTS

CN     205781064 A    12/2016
CN     109555870 U     4/2019
(Continued)

OTHER PUBLICATIONS

International Search Report and Written Opinion from International Application No. PCT/EP2021/086095 mailed Mar. 29, 2022, all pages cited in its entirety.
(Continued)

*Primary Examiner* — David Colon-Morales
(74) *Attorney, Agent, or Firm* — Burr & Forman LLP (57) ABSTRACT

A water socket (110) couplable with a water system, the water socket (110) comprising: a base body (112) defining an annular surface and having a longitudinal axis (LL1); a coupling nipple (114) defined with the base body (112) along the longitudinal axis (LL1), and one or more coupling pins (116) operatively coupled on the annular surface of the base body (112), wherein the one or more coupling pins (116) is movable with respect to the base body (112) along the longitudinal axis (LL1), to an open position and a closed position, and wherein coupling of the hose connector (150) and the water socket (110) is such that the one or more coupling pins (116) at least partially moves to the open position within the base body (112), based on engagement of the coupling pin (116) with the at least one indent (162).

9 Claims, 4 Drawing Sheets

(58) Field of Classification Search
USPC .......................................................... 285/282
See application file for complete search history.

(56) References Cited

U.S. PATENT DOCUMENTS

| | | | | |
|---|---|---|---|---|
| 4,148,459 | A * | 4/1979 | Martinez | F16L 37/23 |
| | | | | 251/149.6 |
| 4,193,576 | A * | 3/1980 | White | F16L 37/113 |
| | | | | 251/149.6 |
| 4,271,865 | A * | 6/1981 | Galloway | F16L 37/36 |
| | | | | 251/89.5 |
| 4,660,804 | A * | 4/1987 | Liu | F16L 37/113 |
| | | | | 251/149.6 |
| 4,819,908 | A * | 4/1989 | Norkey | F16L 37/0987 |
| | | | | 251/149.6 |
| 5,553,638 | A * | 9/1996 | Home | F16L 29/02 |
| | | | | 251/149.6 |
| 6,682,106 | B2 | 1/2004 | Parker | F16L 37/23 |
| | | | | 285/317 |
| 7,083,120 | B2 * | 8/2006 | Gilpatrick | F16L 37/23 |
| | | | | 239/526 |
| 10,865,916 | B2 * | 12/2020 | Tivelli | F16L 29/04 |
| 11,226,058 | B2 * | 1/2022 | Chanclon | B65D 75/5872 |
| 11,306,828 | B2 * | 4/2022 | Chen | F16K 27/067 |
| 11,788,659 | B2 * | 10/2023 | Ekström | F16L 37/34 |
| | | | | 285/316 |
| 2002/0036406 | A1 | 3/2002 | Parker | |
| 2010/0019488 | A1 * | 1/2010 | Weimer | F16L 37/46 |
| | | | | 285/305 |
| 2018/0282983 | A1 | 10/2018 | Lin et al. | |

FOREIGN PATENT DOCUMENTS

| | | | |
|---|---|---|---|
| DE | 102009019934 A1 | 11/2010 | |
| FR | 2927397 A1 | 8/2009 | |
| WO | WO-2010127815 A1 * | 11/2010 | .............. F16L 37/40 |
| WO | 2019063134 A1 | 4/2019 | |
| WO | WO-2022228707 A1 * | 11/2022 | .............. A01G 25/09 |

OTHER PUBLICATIONS

"Gardena Hahnstück mit Wasserstopp"/"Gardena Faucet Piece with Water Stop" (Apr. 18, 2014). Retrieved on Sep. 14, 2023 from https://www.gartentechnik-hansen.de/gardena/bewaesserungstechnik/pipeline/gardena-hahnstueck-mit-wasserstopp/a-442508.

* cited by examiner

HOSE CONNECTOR

TECHNICAL FIELD

The present disclosure relates to a hose connector, and more particularly to a sleeve of the hose connector.

BACKGROUND

A coupling system for watering systems is known, in which a fluid-conducting line coupling may be produced by releasably coupled coupling pieces. The coupling pieces may generally include a water socket (or a water plug) and a hose connector. This type of coupling system is used to couple watering devices (say sprinklers) to the water socket. However, when such coupling is used to couple the water socket and the sprinkler, the sprinkler such as a pulse sprinkler, may inadvertently rotate around its axis due to angular momentum. Due to this rotational movement of the sprinkler, the coupling between the water socket and the hose connector may loosen or even disassemble, and so the hose connector may uncontrollably rotate. This may lead to some unintended applications such as the sprinkler sprinkles outside a previously set sector or area, or even an accident due to undesired disassembly or movement of the hose connector.

An example of a coupling system is provided in Chinese application 101,633,429 (hereinafter referred to as '429 reference). The '429 reference discloses a quick connect and disconnect coupling which does not allow free rotation of the ends of the coupling with respect to one another. The coupling includes a male connector having a coupling end and a female connector having a coupling end with a receiving opening to receive the coupling end of the male connector when the connectors are in coupled condition. A holding mechanism is associated with the connectors to hold them together in coupled condition and allow easy disconnection when desired. Inter engaging co-operable surfaces are provided on the male and female connectors, such as tabs extending from the female connector to engage a flat or other tab mating surface on the male connector to substantially prevent relative rotation of the male connector in relation to the female connector. Further, a notch is provided on a shoulder portion of the female connector to provide clearance to a shoulder portion of the male connector during coupling. However, the '429 reference does not discloses that the notch in the shoulder portion of the female connector blocks free rotational motion of the ends of the coupling with respect to one another.

Another example of the coupling system is provided in Wipo patent application WO2010/127,815A1 (hereinafter referred to as '815 reference). The '815 reference discloses a connector piece (i.e., a water socket) for a click-on connector system used in watering. The connector piece includes a connector (coupling) nipple. A sealing element is arranged in the connector piece and automatically blocks the flow path through the connector piece if no connector sleeve (part of hose connector) is clicked on. When the connector sleeve is clicked onto the connector nipple, a connector element points in the direction of the connector sleeve and sets-off from the same during click-on to lift the sealing element in the interior of the connector piece off the sealing surface and releases the flow path. The coupling sleeve includes a shoulder surface in the plug-in direction, which corresponds radially to position of a coupling pin of the connector nipple of the connector piece. However, the '815 reference does not disclose any coupling arrangement to prevent loosening up of the coupling between the coupling sleeve and connector piece. More particularly, lack of substantial coupling arrangement between the shoulder surface and the coupling pin may lead to undesired or unintended movement (say rotation) of the coupling sleeve when it is used to couple with the connector piece (or say the water socket and the sprinkler in some applications). Hence, the connection between the coupling sleeve and the connector piece may behave unexpectedly, abnormally and lead to watering (say sprinkling and the like) outside a previously set sector or area.

Thus, there is a need of an improved hose connector which allows improved coupling with different watering tools such as a water socket. Further, it would be preferable that the coupling between the hose connector and the water socket is suitable for applications involving rotatable connections therebetween.

SUMMARY

In view of the above, it is an objective of the present disclosure to solve or at least reduce the drawbacks discussed above. The objective is at least partially achieved by a new design of a water system having a water socket couplable with a hose connector. The hose connector includes an outer sleeve and a coupling sleeve operatively coupled within the outer sleeve. The coupling sleeve defines a first end and a second end. The coupling sleeve defines a shoulder around the first end. The water socket includes a base body defining an annular surface and having a longitudinal axis. The water socket includes a coupling nipple defined with the base body along the longitudinal axis, and one or more coupling pins operatively coupled on the annular surface of the base body. The one or more coupling pins is movable with respect to the base body to an open position and a closed position along the longitudinal axis. In the open position, the one or more coupling pins is movable along the longitudinal axis in a direction towards the base body. In the closed position, the one or more coupling pins is movable along the longitudinal axis in a direction away from the base body.

The water system is characterized in that the shoulder of the coupling sleeve defines at least one indent. Further, the one or more coupling pins is brought to the open position by either of a coupling between the shoulder and the one or more coupling pins, or a coupling between the indent and the one or more coupling pins.

Thus, the present disclosure provides an improved water system having an improved design of the hose connector for coupling of a water socket (or a water plug) with watering devices such as a sprinkler. The inclusion of the at least one indent on the shoulder of the coupling sleeve may prevent loosening up of the coupling between the water socket and the hose connector. The presence of the indent thus prevents unintended rotation of the hose connector when it is used to couple the water socket and any watering device (say the sprinkler). Such unintended rotation of the hose connector is prevented due to the coupling (say form-fit) between the at least one indent of the coupling sleeve and at least one coupling pin of the water socket. The at least one indent also functions as a positioning aid and makes it easier to align the hose connector and the sprinkler when reattaching it to the water socket, as the hose connector (along with the sprinkler) settles itself in relation to the at least one coupling pin of the water socket.

According to an embodiment of the present disclosure, the at least one indent of the coupling sleeve allows removable coupling of the hose connector. In this arrangement, the inclusion of the at least one indent on the shoulder of the coupling sleeve allows removable coupling with the one or more coupling pins of the water socket. This allows for easy access and maintenance of various parts involved in the coupling between the water socket and the hose connector.

According to an embodiment of the present disclosure, the at least one indent includes two indents placed diametrically opposite on the shoulder of the coupling sleeve. In this arrangement, the inclusion of two diametrically opposite positioned indents on the shoulder of the coupling sleeve improves strength, and efficiency of the coupling between the water socket and the hose connector. This prevents unintentional rotation of the sprinkler, such as beyond sector limits during a watering operation.

According to an embodiment of the present disclosure, the at least one indent include a tapered or chamfered profile. In this arrangement, the tapered or chamfered profile of the at least one indent results in reduction of force on the one or more coupling pins of the water socket when the at least one indent and the one or more coupling pins are coupled or mated. The tapered or chamfered profile of the at least one indent may also help to minimize wear and tear of the one or more coupling pins and hence improves service life of the one or more coupling pins of the water socket.

According to an embodiment of the present disclosure, the at least one indent has a depth of about 1 mm with respect to the shoulder. In this arrangement, such (say small) depth of the at least one indent ensures that the one or more coupling pins is only partially displaced in mating (longitudinal) direction leading to desired coupling between the at least one indent of the hose connector and the one or more coupling pins of the water socket.

According to an embodiment of the present disclosure, the coupling sleeve is biasingly coupled within the outer sleeve. The coupling sleeve may be coupled with the outer sleeve based on any coupling technique, arrangement used or known in the art, to allow easy and efficient assembly/disassembly of the hose connector with the water socket. In this arrangement, the outer sleeve is displaced longitudinally in a direction away from the water socket of the watering system to allow the coupling between the at least one indent and the one or more coupling pins of the water socket. The outer sleeve is released once the desired coupling is achieved so that the outer sleeve locks the coupling between the at least one indent and the one or more coupling pins and thereby strengthen the coupling between the water socket and the hose connector.

According to an embodiment of the present disclosure, a water socket is couplable with the hose connector. The water socket includes a base body defining an annular surface and having a longitudinal axis. The water socket includes a coupling nipple defined with the base body along the longitudinal axis, and one or more coupling pins operatively coupled on the annular surface of the base body. The one or more coupling pins is movable with respect to the base body along the longitudinal axis, to an open position and a closed position. The coupling of the hose connector and the water socket is such that the one or more coupling pins at least partially moves to the open position within the base body, based on engagement of the coupling pin with the at least one indent.

The present disclosure thus provides coupling between the at least one indent of the hose connector and the one or more coupling pins to prevent loosening up of the coupling between the water socket and the hose connector. This prevents undesired, unsafe rotation of the hose connector when the hose connector is used to couple the water socket and the sprinkler. Such unintended rotation of the hose connector is prevented due to the coupling (say form-fit) between the at least one indent of the hose connector and the one or more coupling pins of the water socket. In this arrangement, the longitudinal movement of the one or more coupling pins may allow the water socket to function as a valve. Thus, when the one or more coupling pins are engaged or disengaged with the at least one indent of the hose connector, the water flowing through the water socket to the sprinkler via the hose connector may be automatically allowed or disallowed.

According to an embodiment of the present disclosure, the one or more coupling pins includes two coupling pins positioned diametrically opposite around the coupling nipple. In this arrangement, the inclusion of two diametrically opposite positioned coupling pins around the coupling nipple improves strength of the coupling between the water socket and the hose connector. This prevents unintentional rotation of the hose connector and the sprinkler connected therewith, beyond the sector limits during a watering operation.

According to an embodiment of the present disclosure, the one or more coupling pins in the closed position, in absence of engagement of the coupling pin with the at least one indent of the hose connector, disallow a liquid flow through the water socket. In this arrangement, the longitudinal movement of the one or more coupling pins allows the water socket to function as a valve. When the one or more coupling pins are disengaged with the at least one indent of the hose connector, the one or more coupling pins reach the closed position and the liquid (say water) flow through the water socket is automatically disallowed.

According to an embodiment of the present disclosure, the one or more coupling pins in the open position within the base body, on engagement of the coupling pin with the at least one indent of the hose connector, allow a liquid flow through the water socket. In this arrangement, the longitudinal movement of the one or more coupling pins allows the water socket to function as a valve. When the one or more coupling pins are engaged with the at least one indent of the hose connector, the one or more coupling pins reach the open position and the water flow through the water socket to the sprinkler via the hose connector is automatically allowed.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

Figure 1:
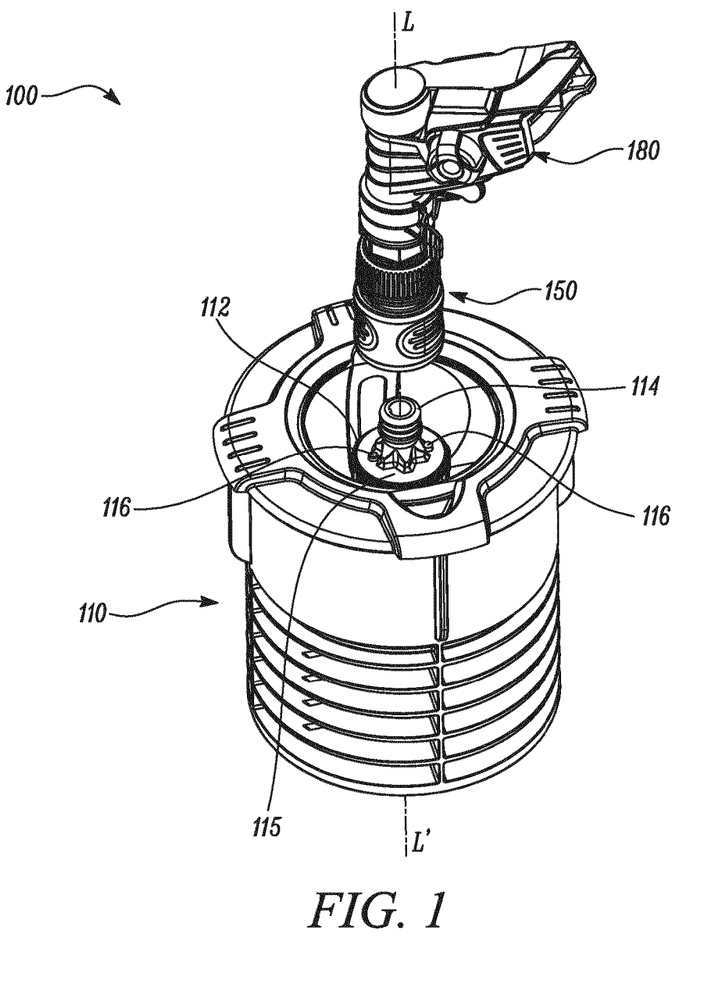
FIG. 1 shows a perspective view of a watering system having a water socket couplable with a hose connector, in accordance with an embodiment of the present invention.

FIG. 1 illustrates a water system 100 having a water socket 110 couplable with a hose connector 150. This type of the water system 100 is used to couple the water socket 110 with watering devices such as a sprinkler 180. The sprinkler 180 may be a circular sprinkler, a square sprinkler, a contour sprinkler, or an impulse sprinkler. The water socket 110 provides an opening for the discharge of water from a water source (not shown) to the sprinkler 180. The water socket 110 includes a base body 112 defining an annular surface 115 and having a longitudinal axis LL'. Further, a coupling nipple 114 is defined with the base body 112 along the longitudinal axis LL', and one or more coupling pins 116 are operatively coupled on the annular surface 115 of the base body 112. The hose connector 150 couples the sprinkler 180 to the water source via the water socket 110. The hose connector 150 includes a coupling sleeve 154 and an outer sleeve 152, as shown in FIG. 2.

The hose connector 150 may be made of any material such as plastic, a PVC material or any other suitable material known or used in the art to improve durability. The hose connector 150 may be made frost-proof or leakage proof to overcome damage due to frost in cold and chilly weather.

During implementation of the water system 100 to couple the water socket 110 and the sprinkler 180, the sprinkler 180 may rotate around the axis (say the longitudinal axis LL') of the water socket 110 due to angular momentum. Due to this rotational movement of the sprinkler 180, the coupling between the water socket 110 and the hose connector 150 may loosen or disassemble. Hence, the sprinkler 180 may work abnormally or sprinkle outside a previously set sector or area.

Figure 2:
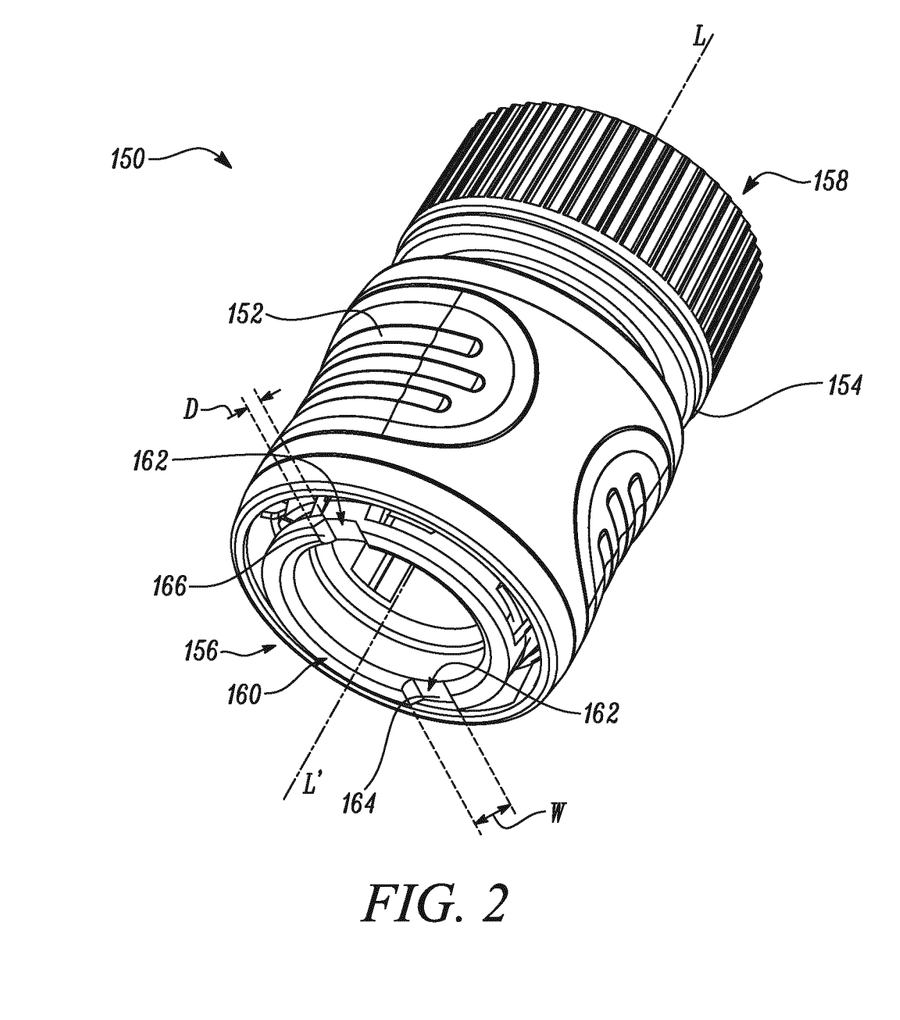
FIG. 2 shows a perspective view of a hose connector, in accordance with an embodiment of the present invention.

FIG. 2 illustrates the hose connector 150. The hose connector 150 allows improved coupling between the water socket 110 and the sprinkler 180. The hose connector 150 includes the outer sleeve 152 and the coupling sleeve 154 operatively coupled within the outer sleeve 152. The coupling sleeve 154 defines a first end 156 and a second end 158. The coupling sleeve 154 defines a shoulder 160 around the first end 156. The hose connector 150 is such that the shoulder 160 of the coupling sleeve 154 defines at least one indent 162.

As illustrated in some embodiments, the at least one indent 162 includes two indents placed diametrically opposite on the shoulder 160 of the coupling sleeve 154. The inclusion of two diametrically opposite positioned indents 162 on the shoulder 160 of the coupling sleeve 154 improves strength of the coupling 100 between the water socket 110 and the hose connector 150. This may prevent unintentional rotation of the sprinkler 180 beyond the sector limits during watering. In some embodiments, the at least one indent 162 may also include a different number of indents as per application requirements.

In some embodiments, multiple pairs of diametrically opposite indents 162 may be preferred on the shoulder 160, such as based upon type, service life, and dimensions of the hose connector 150 and the coupling pins 116. The diametrically opposite arrangement of the at least one indents 162 may be preferable over other possible arrangements as this arrangement allows for uniform distribution of force on the at least one indents 162 when the coupling is established with the water socket 110.

The at least one indent 162 includes a tapered or chamfered profile 166. The tapered or chamfered profile 166 of the at least one indent 162 may result in reduction of force on the one or more coupling pins 116 of the water socket 110 when the at least one indent 162 couples with the one or more coupling pins 116 (as shown in FIG. 3B). The tapered or chamfered profile 166 of the at least one indent 162 may minimize wear and tear of the one or more coupling pins 116 and hence improve life of the one or more coupling pins 116. The tapered or chamfered profile 166 may have an angle range such as, but not limited to, between 30 degrees to 45 degrees with respect to a surface 164 of the shoulder 160. The tapered or chamfered profile 166 may remove sharp edges on the at least one indent 162 and may prevent cuts to a user handling the hose connector 150 (say in an uncoupled state). The tapered, or chamfered profile 166 thus may ensures user safety, along with improved handling of the hose connector 150.

The at least one indent 162 has a depth "D". The depth "D" may be generally measured from the surface 164 to the shoulder 160. As will be evident and as shown in FIG. 2, the depth "D" may be generally measured along the longitudinal axis LL' between the surface 164 to an end (say around the first end 156) of the tapered, or chamfered profile 166. In some embodiments, the depth "D" is about 1 mm with respect to the shoulder 160. The depth "D" of the at least one indent 162 ensures that the one or more coupling pins 116 having a height "H" (shown in FIG. 3A) is only partially displaced in mating (longitudinal) direction leading to the coupling between the at least one indent 162 and the one or more coupling pins 116 of the water socket 110. As will be evident to a person having knowledge in the art, the depth "D" may be any length say ranging from 0.5 mm to 1.5 mm and the present disclosure is not to be limited by the depth of the indent 162 in any manner. The depth "D" of the at least one indent 162 should be such that to provide the dual purpose of achieving the coupling and longitudinally displacing the one or more coupling pins 116 for allowing liquid flow through the water socket 110.

The at least one indent 162 has a width "W". The width "W" is such that the one or more coupling pins 116 slidingly engages with the at least one indent 162. As will be evident to a person having knowledge in the art, the width "W" may be in accordance with a diameter "d" of the one or more coupling pins 116 so that there is minimum or no free space between the at least one indent 162 and the one or more coupling pins 116 on engagement. The relation between the width "W" and the diameter "d" is important as any substantial free spaces may lead to undesired or abnormal rotation of the coupling and also the sprinkler 180.

The at least one indent 162 of the coupling sleeve 154 allows removable coupling of the hose connector 150. The removable coupling may be a quick-coupling, form-fit coupling or any other type of quick-connecting coupling known or used in the art for coupling the water socket 110 and the hose connector 150. The removable coupling allows for easy access and maintenance of the various parts of the water socket 110 and hose connector 150.

Figure 3A:
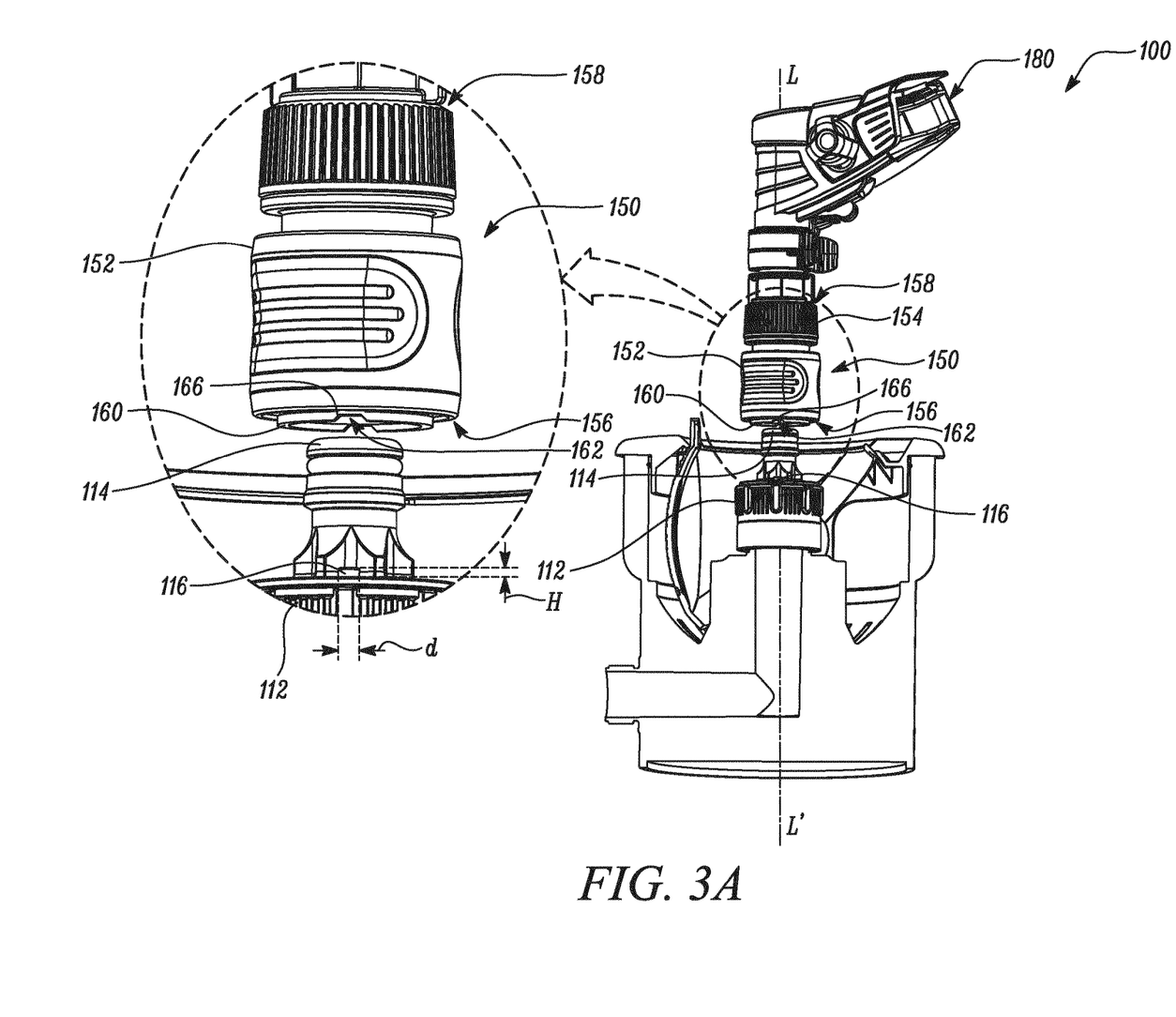
FIG. 3A shows a partial sectional view of the water socket of FIG. 1 before assembly with the hose connector, in accordance with an embodiment of the present invention.
Figure 3B:
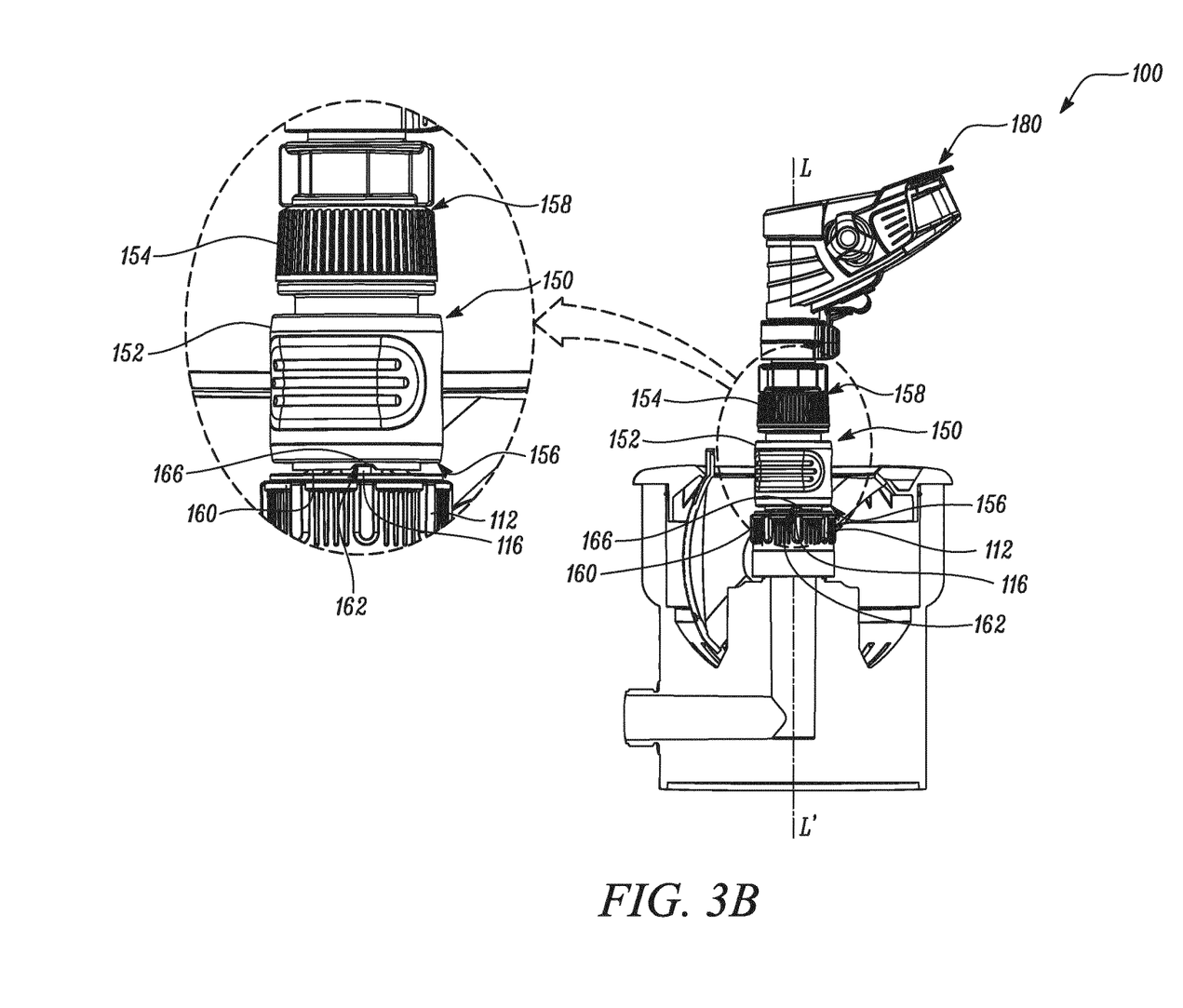
FIG. 3B shows a partial sectional view of the water socket of FIG. 1 after assembly with the hose connector, in accordance with an embodiment of the present invention.

FIGS. 3A and 3B illustrate the water system 100 before and after coupling of the water socket 110 and the hose connector 150. The water socket 110 is couplable with the hose connector 150. The water socket 110 includes the base body 112 defining the annular surface 115 and having the longitudinal axis LL'. The coupling nipple 114 is defined with the base body 112 along the longitudinal axis LL', and one or more coupling pins 116 is operatively coupled on the annular surface 115 of the base body 112. The one or more coupling pins 116 is movable with respect to the base body 112 along the longitudinal axis LL', to an open position and a closed position. In the open position, the one or more coupling pins 116 is movable along the longitudinal axis LL' in a direction towards the base body 112. Further, in the closed position, the one or more coupling pins 116 is movable along the longitudinal axis LL' in a direction away from the base body 112.

The coupling 100 of the hose connector 150 and the water socket 110 is such that the one or more coupling pins 116 at least partially moves to the open position within the base body 112, based on engagement of the coupling pin 116 with the at least one indent 162. Further, the coupling 100 of the hose connector 150 and the water socket 110 is such that the one or more coupling pins 116 at least partially moves to the open position within the base body 112, based on engagement of the coupling pin 116 with the shoulder 160.

The one or more coupling pins 116 is movable with respect to the base body 112 along the longitudinal axis LL', to the open position and the closed position as shown in FIGS. 3A and 3B, respectively. The coupling of the hose connector 150 and the water socket 110 is such that the one or more coupling pins 116 at least partially moves to the open position within the base body 112, based on engagement of the coupling pin 116 with the shoulder 160 of the hose connector 150. Further, the coupling of the hose connector 150 and the water socket 110 is such that the one or more coupling pins 116 at least partially moves to the open position within the base body 112, based on engagement of the coupling pin 116 with the at least one indent 162 of the hose connector 150. The one or more coupling pins 116 is brought to the open position by either of a coupling between the shoulder 160 and the one or more coupling pins 116, or a coupling between the indent 162 and the one or more coupling pins 116.

In some embodiments, the one or more coupling pins 116 in the closed position, in absence of engagement of the coupling pin 116 with the at least one indent 162 of the hose connector 150, disallow a liquid flow through the water socket 110.

In some embodiments, the one or more coupling pins 116 in the open position within the base body 112, on engagement of the coupling pin 116 with the at least one indent 162 of the hose connector 150, allow a liquid flow through the water socket 110. In some embodiments, the one or more coupling pins 116 in the open position within the base body 112, on engagement of the coupling pin 116 with the shoulder 160 of the hose connector 150, allow a liquid flow through the water socket 110. The valve function of the water socket 110 due to the longitudinal movement of the one or more coupling pins 116 as described above may be achieved by different mechanisms inside the water socket 110. The mechanism may involve use of springs, pistons, or the like, or any other mechanism as per the application.

The one or more coupling pins 116 includes two coupling pins 116 positioned diametrically opposite around the coupling nipple 114. However actual implementation of the present disclosure may have any type, number, placement, arrangement, dimensions of the coupling pins 116. The inclusion of two diametrically opposite positioned coupling pins 116 around the coupling nipple 114 improves the coupling between the water socket 110 and the hose connector 150 and thereby prevents unintentional rotation of the sprinkler 180 beyond the sector limits during watering. The diametrically opposite arrangement of the one or more coupling pins 116 is preferable as this arrangement allows for uniform distribution of force on the one or more coupling pins 116 when the coupling is established with the water socket 110.

Thus, the present disclosure provides an improved design of the hose connector 150 for coupling of water socket 110 with watering devices such as the sprinkler 180. The improved coupling involving indent-based design of the hose connector 150 is illustrated in FIG. 3B. The inclusion of the at least one indent 162 on the shoulder 160 of the coupling sleeve 154 prevents loosening up of the coupling 100 between the water socket 110 and the hose connector 150 and hence prevents inadvertent rotation of the hose connector 150. Such unintended rotation of the hose connector 150 is prevented due to the coupling between the at least one indent 162 of the coupling sleeve 154 and the at least one coupling pin 116 of the water socket 110. The at least one indent 162 also functions as a positioning aid and makes it easier to align the sprinkler 180 when reattaching it to the water socket 110, as the sprinkler 180 settles itself in relation to the at least one coupling pin 116 of the water socket 110. Further, in addition, the shoulder 160 also provides another alternative to push the one or more coupling pins 116 to the open position.

In this arrangement, the longitudinal movement of the one or more coupling pins 116 allows the water socket 110 to function as a valve. Thus, when the one or more coupling pins 116 is engaged with the at least one indent 162 (or the shoulder 160) of the hose connector 150, the water flow through water socket 110 to the sprinkler 180 via the hose connector 150 is automatically allowed. And when the one or more coupling pins 116 are disengaged with the at least one indent 162 (or the shoulder 160) of the hose connector 150, the water flow through water socket 110 is automatically disallowed. The valve function of the water socket 110 prevents wastage of water while providing a simple, efficient, and user-friendly operation.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Watering system
110 Water Socket
112 Base Body

114 Coupling Nipple
115 Annular Surface
116 Coupling Pin
150 Hose Connector
152 Outer Sleeve
154 Coupling sleeve
156 First end
158 Second end
160 Shoulder
162 Indent
164 Surface
166 Tapered or Chamfered Profile
180 Sprinkler
LL' Longitudinal Axis
D Depth of indent
W Width of indent
d Diameter of coupling pin
H Height of coupling pin

The invention claimed is:

1. A water system having a water socket couplable with a hose connector, the hose connector,
the hose connector comprising:
an outer sleeve;
a coupling sleeve operatively coupled within the outer sleeve, wherein the coupling sleeve defines a first end and a second end, and wherein the coupling sleeve defines a shoulder around the first end thereof, and
the water socket comprising:
a base body defining an annular surface and having a longitudinal axis;
a coupling nipple defined with the base body along the longitudinal axis, and
one or more coupling pins operatively coupled on the annular surface of the base body, wherein the one or more coupling pins is movable with respect to the base body along the longitudinal axis, to an open position and a closed position;
wherein in the open position, the one or more coupling pins is movable along the longitudinal axis in a direction towards the base body;
wherein in the closed position, the one or more coupling pins is movable along the longitudinal axis in a direction away from the base body;
wherein the shoulder of the coupling sleeve defines at least one indent;
wherein the one or more coupling pins is brought to the open position by either of:
a coupling between the shoulder and the one or more coupling pins; or
a coupling between the at least one indent and the one or more coupling pins; and
wherein the at least one indent is not centered along the longitudinal axis.

2. The water system of claim 1,
wherein the at least one indent of the coupling sleeve allows removable coupling of the hose connector.

3. The water system of claim 1,
wherein the at least one indent includes two indents placed diametrically opposite on the shoulder of the coupling sleeve.

4. The water system of claim 1,
wherein the at least one indent includes a tapered or chamfered profile.

5. The water system of claim 1,
wherein the at least one indent has a depth of about 1 mm with respect to the shoulder.

6. The water system of claim 1,
wherein the coupling sleeve is biasingly coupled within the outer sleeve.

7. The water system according to claim 1,
wherein the one or more coupling pins includes two coupling pins positioned diametrically opposite around the coupling nipple.

8. The water system according to claim 1,
wherein the one or more coupling pins in the closed position, in absence of engagement of the one or more coupling pins with the at least one indent of the hose connector, disallow a liquid flow through the water socket.

9. The water system according to claim 1,
wherein the one or more coupling pins in the open position within the base body, on engagement of the one or more coupling pins with the at least one indent of the hose connector, allow a liquid flow through the water socket.

* * * * *